United States Patent Office 3,560,150
Patented Feb. 2, 1971

3,560,150
SEPARATION OF NITRIC AND
PHOSPHORIC ACIDS
Joseph W. Markey, College Park, Ga., assignor to
Cities Service Company
No Drawing. Filed July 31, 1968, Ser. No. 748,966
Int. Cl. C01b 21/46, 25/22
U.S. Cl. 23—158                                      10 Claims

ABSTRACT OF THE DISCLOSURE

Nitric acid can be separated from a mixture of nitric and phosphoric acids by contact with nitric oxide, which reacts with the nitric acid to form nitrogen dioxide gas and water. The nitrogen dioxide gas is removed so that a phosphoric acid solution containing a greatly reduced nitrite concentration can be obtained. The nitrogen dioxide gas stream can be employer to produce additional quantities of nitric acid. The mixture of nitric and phosphoric acids can be obtained from the nitric acid acidulation of phosphate rock followed by removal of calcium nitrate.

If the nitric oxide stream as formed is to be cooled prior to contacting the acid mixture and this stream contains oxygen, it should be quickly quenched to below about 500° C. to minimize the formation of nitrogen dioxide. One convenient source of a nitric oxide-containing gas stream is the thermal decomposition of calcium nitrate at a temperature of about 650° C. The nitric oxide may also be obtained by the reaction of air and ammonia gas at a temperature of about 900–1,000° C. in the presence of an oxidation catalyst. Since oxygen will generally be present in each of these product gas streams, a rapid quenching to below about about 500° C. is necessary in order to minimize the reaction of oxygen with the nitric oxide.

BACKGROUND OF THE INVENTION

Field of the invention

This invention relates to the separation of acids from from a mixture thereof. More particularly, it relates to the separation of nitric acid from a mixture of nitric acid and phosphoric acid.

Description of the prior art

Phosphoric acid is produced by the acidulation of phosphate rock with various acids such as sulfuric acid, hydrocholoric acid and nitric acid. When nitric acid is thus employed, an acidulation mixture comprising product phosphoric acid, by-product calcium nitrate, and excess nitric acid is obtained. Various methods are known in the art for separating calcium nitrate from the acidulation mixture, thus leaving essentially a mixture of phosphoric acid and nitric acid.

In the well known "Odda" process, an excess of nitric acid over that theoretically equivalent to the calcium in the rock as calcium nitrate is used to digest the phosphate rock. The acidulate is then chilled to crystallize calcium nitrate tetrahydrate. After removal of the tetrahydrate, the remaining acidulate solution is normally ammoniated to produce a solid fertilizer material containing calcium and ammonium phosphates. Ammonium nitrate is also formed due to the presence of the excess nitric acid in the acidulate. The presence of ammonium nitrate, however, tends to make the phosphate products hygroscopic. It is generally necessary to coat the individual particles with a clay or some other material so as to prevent caking during storage and handling. The presence of the ammonium nitrates in the mixed fertilizer material has the added disadvantage of limiting the ratio of $P_2O_5$ to nitrogen that can be obtained in the product mixed fertilizer compositions.

It is highly desirable, therefore, that residual nitric acid be removed from the phosphate rock acidulate not only when phosphoric acid itself is to be recovered, but also prior to ammoniation of the phosphate rock acidulate to produce ammonium phosphates. A separation of the excess nitric acid from the product phosphoric acid may be accomplished by simple boiling. This technique is not satisfactory in commercial operations, however, because of the excessive amount of heat required due to vapor pressure relationships. In addition, the presence of residual calcium in the acidulate tends to cause fouling of heat transfer surfaces.

Because of the difficulties associated with the removal of nitric acid from admixture with phosphoric acid by simple boiling, other means for accomplishing this operation have heretofore been proposed. For example, sulfuric acid has been employed, after calcium nitrate tetrahydrate removal, to precipitate the balance of the calcium as gypsum. Upon removal of the gypsum, the acidulate is subjected to fractionation in a column under high vacuum to remove nitric acid from the acidulate. In order to obtain a low residual nitric acid content, it is necessary to concentrate the phosphoric acid nearly to the range of superphosphoric acid, a concentration not normally required for the bulk of ordinary phosphatic fertilizer production.

The use of the barium ion to remove the nitric acid has also been proposed. Following removal of calcium nitrate, the barium ion is added, and additional refrigeration is employed to crystallize barium nitrate. The barium nitrate is then reacted with ammonia and carbon dioxide to produce barium carbonate and by-product ammonium nitrate. While this process may be employed for the removal of nitric acid from the acidulate, it is disadvantageous, from a practical viewpoint, in view of the costly nature of the process.

It is an object of the present invention, therefore, to provide an improved process for the separation of nitric acid from admixture with phosphoric acid.

It is another object of the invention to provide a more economical method for separating nitric acid from a mixture of nitric and phosphoric acids.

It is a further object of the present invention to provide a process for the removal of excess nitric acid from an acidulate formed by the acidulation of phosphate rock with nitric acid.

With these and other objects in mind, the present invention is hereinafter described, and the novel features thereof are pointed out in the appended claims.

SUMMARY OF THE INVENTION

A mixture of nitric and phosphoric acids, in accordance with the present invention, is contacted with nitric oxide. The nitric oxide reacts with the nitric acid content of the mixture to form nitrogen dioxide gas and water. The nitrogen dioxide gas may be removed from the phosphoric acid-containing solution, so as to produce a phosphoric acid solution having a greatly reduced nitrate concentration. The nitrogen dioxide stream separated from the acidulate may be employed for the production of additional quantities of nitric acid in accordance with known techniques. The nitric oxide employed in the practice of the present invention is commonly obtained in the form of a gas stream comprising nitric oxide and oxygen. In this circumstance, the temperature of the gas stream may conveniently be within the range of from about 25° C. to about 500° C. Temperatures above about 500° C. are generally to be avoided in order to prevent the reaction of the nitric oxide with oxygen to form nitrogen dioxide. When the nitric oxide is formed at a higher temperature than about 500° C. and is recovered as a gas stream comprising nitric oxide and oxygen, this gas stream is advantageously quenched rapidly to a temperature below about 500° C. so as to preclude the undesired reaction of the nitric oxide with oxygen. Quenching to a temperature of from about 300° C. to about 500° C. in about three seconds or less is quite suitable for this purpose.

The present invention is particularly suitable for removing nitric acid from phosphoric acid following the acidulation of phosphate rock with nitric acid and the removal of by-product calcium nitrate from the acidulation mixture. The present invention may, however, be employed in any other suitable application in which a mixture of nitric and phosphoric acids are to be separated. The concentration of phosphoric acid in the mixture to be separated will ordinarily be within the range of from about 25% to about 98% by weight of the solution containing the mixture. The nitric acid concentration will ordinarily be within the range of from about 1% to about 50% by weight of the solution. When the nitric acid concentration is greater than about 5%, however, it may be convenient to evaporate the solution down to a nitric acid concentration of about 5% by weight prior to the addition of nitric oxide. Thus preliminary concentration may be accomplished by an ordinary evaporation technique or by means of a vacuum concentration operation. Evaporation below about 5% by weight nitric acid becomes undesirable from an operating viewpoint, and further reduction in the nitric acid concentration is accomplished by contact of the acid solution with nitric oxide.

DETAILED DESCRIPTION OF THE INVENTION

The present invention may be employed to separate nitric acid from any mixture of nitric and phosphoric acids commonly encountered in commercial operation. In the production of phosphoric acid and phosphatic fertilizer compositions by the nitric acid acidulation of phosphate rock, for example, it is often necessary or desirable to remove the excess nitric acid from the product phosphoric acid solution as discussed above. The proportions of nitric acid and phosphoric acid in the mixture to be separated are not critical, but will be limited primarily by the practical limitations under which such mixtures of nitric acid and phosphoric acid will exist in ordinary commercial operations.

The concentration of phosphoric acid in the solution containing the mixture to be separated will ordinarily be within the range of from about 25% to about 98% by weight of said solution. The concentration of nitric acid in this solution will ordinarily be within the range of from about 1% to about 50% by weight of the solution. Mixtures in which the concentration of the acids is outside the ranges hereinabove specified may also be treated in accordance with the present invention to produce a phosphoric acid solution having a greatly reduced nitrate concentration although such mixtures are not normally encountered in existing commercial operations.

The mixture of nitric and phosphoric acids is contacted, in accordance with the present invention, with nitric oxide. This nitric oxide, which reacts with the nitric acid present in the mixture to form nitrogen dioxide in water, may be either in liquid or in gaseous form, although nitric oxide gas is usually more conveniently available for this purpose. The nitric oxide stream may be obtained, for example, by a standard ammonia oxidation process in which a mixture of air and ammonia gas is passed over a conventional oxidation catalyst at a temperature usually in the range of about 900–1,000° C. The resultant nitric oxide gas, if handled as hereinafter set forth to prevent its oxidation to nitrogen dioxide, may be contacted directly with the mixture of acids to be separated.

Another convenient source for the necessary nitric oxide gas is the thermal decomposition of calcium nitrate at approximately 650° C. The resulting gaseous decomposition products must also be handled so as to prevent the undesired reaction of the nitric oxide gas with oxygen in the decomposition product stream.

While the oxidation of ammonia and the decomposition of calcium nitrate have been specifically mentioned as sources for the desired nitric oxide, it will be appreciated that any other convenient source or supply of nitric oxide, either in liquid form or as a gas, may be employed in the practice of the present invention. The nitric oxide and the solution containing the mixture of acids to be separated may be contacted in any convenient manner assuring a thorough contacting of the nitric oxide and the mixture of acids. When nitric oxide gas is employed, for example, a liquid stream containing the nitric and phosphoric acids to be separated may be contacted counter-currently with the gas stream containing nitric oxide.

The reaction of nitric oxide with oxygen to produce nitrogen dioxide, which is undesired for the purposes of this invention, may be minimized by rapidly quenching the nitric oxide stream produced by catalytic ammonia oxidation, calcium nitrate decomposition or equivalent processes. In order to avoid appreciable reaction of the nitric oxide with oxygen, it is necessary to quench the nitric oxide-oxygen stream to below about 500° C., preferably to from about 300° C. to about 500° C. This quenching must ordinarily be accomplished as rapidly as possible, preferably within about 3 seconds or less if the conversion of appreciable quantities of nitric oxide is to be avoided.

Apart from the limitation referred to hereabove with respect to a gas stream comprising nitric oxide and oxygen, the temperature of the nitric oxide upon contact with the solution containing the mixture of acids to be separated is not critical and may vary widely depending upon the particular circumstance in which the nitric oxide is available for the purposes of this invention. The temperature of the nitric oxide will generally be in the range of from about 25° C. to about 500° C. If the nitric oxide is obtained in a gas stream with oxygen at an elevated temperature, as by the catalytic oxidation of ammonia and the decomposition of calcium nitrate mentioned above, the temperature of the nitric oxide-containing gas stream will normally be quenched to at least a temperature in the range from about 300° C. to about 500° C. Lower temperatures can, of course, also be employed with temperatures within the range of from about 25° C. to about 100° C. being convenient in many instances.

The nitric oxide may be contacted with the mixture of acids to be separated at atmospheric pressure although higher pressure may also be employed if desired. Pressures as high as from about 60 to about 120 p.s.i.g. may, for example, conveniently be employed. Since higher pressures tend to favor the undesired formation of nitrogen dioxide if the nitric oxide is in the presence of oxygen, essentially atmospheric pressure will generally be employed. In one embodiment, a nitric oxide-oxygen gas stream formed at an elevated temperature and pressure may be subjected to an expansion cooling in order to quickly quench this mixture to a lower temperature without the formation of appreciable quantities of nitrogen dioxide. It will be appreciated by those skilled in the art that operating conditions, such as temperature, pressure, and concentration of gases, should be balanced in each instance in accordance with known thermodynamic principles so as to minimize the undesired reaction of nitric oxide with any oxygen that may be present in the gas stream.

In another embodiment of this invention, it is sometimes convenient to subject a mixture of nitric and phosphoric acids to a preliminary evaporation operation prior to contacting the mixture with nitric oxide. This preliminary evaporation may be accomplished by ordinary evaporation techniques or by means of a vacuum concentration operation. Nitric acid and water will be evolved in the evaporation operation. A concentrated nitric acid stream may be recovered and recycled, in phosphate rock acidulation operations, for the treatment of additional quantities of rock. The preliminary evaporation operation may be economically advantageous in reducing the nitric acid concentration of the mixture being treated to about 5% by weight. Reducing the concentration below about 5% by such an evaporation operation, however, becomes increasingly difficut and costly from an operating viewpoint. The increasing corrosiveness of the evaporated material further deters continued evaporation of the solution containing the mixture of acids. In this embodiment reduction of the nitric acid content of the mixture below about 5% by weight would be accomplished by contact with nitric oxide as heretofore set forth. While any mixture may be treated with nitric oxide in order to substantially reduce the nitric acid content, therefore, the use of nitric oxide for this purpose is particularly advantageous in removing nitric acid that is present in relatively small amounts, as for example from about 1% to about 5% by weight. It is in the removal of nitric acid present in this proportion in the mixture of acids that is particularly difficult and uneconomical to remove by conventional techniques heretofore employed in the art.

To illustrate the practice of the present invention, a solution containing a mixture of phosphoric and nitric acids was prepared by acidulating phosphate rock with an excess of nitric acid and precipitating by-product calcium nitrate. Upon removal of the by-product calcium nitrate by filtration, a filtrate solution containing approximately 14% by weight phosphoric acid and over 30% by weight nitric acid was obtained. This filtrate was evaporated to a phosphoric acid concentration of about 52% by weight. The nitric acid content of the mixture was thereby reduced to about 5% by weight.

The resulting solution was contacted counter-currently with nitric oxide gas at approximately 80° C. The nitrogen dioxide gas formed by the reaction of the nitric oxide with the nitric acid content of the solution was removed, and the resulting product solution contained 65.8% by weight phosphoric acid and only about 0.4% by weight nitric acid.

The present invention provides a convenient and relatively inexpensive means for separating nitric acid from a mixture of nitric and phosphoric acids. In view of the increasing attention given by the phosphoric acid and phosphatic fertilizer industry to the nitric acid acidulation of phosphate rock, the present invention becomes of paramount importance. By providing an improved method for separating excess nitric acid from admixture with product phosphoric acid, the present invention enhances the nitric acid acidulation process as an attractive potential alternative to acidulation with sulfuric acid. In view of the concern in the industry as to the sufficiency of sulfur to meet the prospective demands of the fertilizer industry, the significance of the contribution of the present invention becomes untold.

The invention has been described herein with reference to particular embodiments thereof. It will be appreciatd by those skilled in the art that various changes and modifications can be made in the practice of the invention without departing from the scope of the invention as set forth in the appended claims.

Therefore, I claim:

1. A method for separating nitric acid from a mixture of nitric and phosphoric acids comprising:
    (a) contacting a solution containing a mixture of said nitric and phosphoric acids with nitric oxide, the nitric acid and nitric oxide reacting to form nitrogen dioxide gas and water; and
    (b) removing said nitrogen dioxide gas from the phosphoric acid-containing solution,
whereby a phosphoric acid solution having a greatly reduced nitrate concentration may be obtained together with a nitrogen dioxide gas stream from which additional quantities of nitric acid may readily be produced.

2. The method of claim 1 in which a nitric oxide gas stream is contacted counter-current with the nitric acid-phosphoric acid liquid stream.

3. The method of claim 1 in which the nitric oxide is present in a gas stream comprising nitric oxide and oxygen.

4. The method of claim 3 in which the temperature of said gas stream is within the range of from about 25° C. to about 500° C.

5. The method of claim 4 in which the temperature is within the range of from about 300° C. to about 500° C.

6. The method of claim 4 in which the temperature is within the range of from 25° C. to about 100° C.

7. The method of claim 3 in which the gas stream comprising nitric oxide and oxygen is obtained by the thermal decomposition of calcium nitrate at a temperature of about 650° C., the resulting gaseous decomposition products comprising nitric oxide and oxygen being quenched rapidly to a temperature below about 500° C. so as to preclude the reaction of said gaseous decomposition products to form higher oxides of nitrogen.

8. The method of claim 3 in which said gas stream comprising nitric oxide and oxygen is obtained by the reaction of air and ammonia gas at a temperature of about 900° C. to about 1000° C. in the presence of an oxidation catalyst, the resulting gaseous reaction products comprising nitric oxide and oxygen being quenched rapidly to a temperature below about 500° C. so as to preclude the reaction of said gaseous reaction products to form higher oxides of nitrogen.

9. The method of claim 1 in which the nitric acid concentration of the solution containing the mixture of acids is more than about 5% by weight and including the preliminary evaporation of said solution to a nitric acid concentration of not more than about 5% by weight prior to contacting said solution with nitric oxide.

10. The method of claim 9 in which the solution contacted by said nitric oxide has a nitric acid content of from about 1% to about 5% by weight.

References Cited
UNITED STATES PATENTS

| | | | |
|---|---|---|---|
| 1,856,144 | 5/1932 | Wietzel et al. | 23—165 |
| 1,857,346 | 5/1932 | Beck | 23—161 |
| 2,985,527 | 5/1961 | Nossen | 71—39 |
| 2,988,425 | 6/1961 | Sutherland et al. | 23—157 |
| 3,110,563 | 11/1963 | Kraus et al. | 23—162 |
| 3,333,923 | 8/1967 | Leatham et al. | 23—163 |

OSCAR R. VERTIZ, Primary Examiner

G. O. PETERS, Assistant Examiner

U.S. Cl. X.R.

23—161, 165